United States Patent
Watanabe

(10) Patent No.: US 10,563,034 B2
(45) Date of Patent: Feb. 18, 2020

(54) EXPANDED POLYSTYRENE-BASED RESIN FORMED PRODUCT COMPRISING RUBBER-LIKE LATEX AND MELAMINE CYANURATE AND PRODUCTION METHOD THEREOF

(71) Applicant: Takashima & Co., Ltd.

(72) Inventor: Yoshio Watanabe, Chiba (JP)

(73) Assignee: Takashima & Co., Ltd., Tokyo (JP)

( * ) Notice: Subject to any disclaimer, the term of this patent is extended or adjusted under 35 U.S.C. 154(b) by 0 days.

(21) Appl. No.: 14/848,986

(22) Filed: Sep. 9, 2015

(65) Prior Publication Data
US 2016/0068649 A1 Mar. 10, 2016

(30) Foreign Application Priority Data
Sep. 9, 2014 (JP) .................. 2014-183162

(51) Int. Cl.
*C08J 9/224* (2006.01)
(52) U.S. Cl.
CPC ........... *C08J 9/224* (2013.01); *C08J 2325/06* (2013.01)
(58) Field of Classification Search
CPC ...................................................... C08J 9/224
See application file for complete search history.

(56) References Cited

U.S. PATENT DOCUMENTS

| | | | |
|---|---|---|---|
| 3,462,293 A * | 8/1969 | Voris ................ | B01J 8/008 427/213 |
| 3,913,298 A | 10/1975 | Cogliano | |
| 4,307,134 A * | 12/1981 | Milkovich ............ | C08F 257/02 427/222 |
| 5,929,154 A | 7/1999 | Masuyama et al. | |
| 2005/0173684 A1 | 8/2005 | Schlosser et al. | |
| 2011/0294910 A1 * | 12/2011 | Kriha ....................... | C08J 9/232 521/59 |
| 2011/0313069 A1 | 12/2011 | Onishi et al. | |
| 2012/0301700 A1 * | 11/2012 | Hitzler ................ | B29C 44/3461 428/221 |
| 2014/0128489 A1 * | 5/2014 | Eberstaller ............ | C07C 279/02 521/85 |

FOREIGN PATENT DOCUMENTS

| | | |
|---|---|---|
| CN | 103497477 A | 1/2014 |
| CN | 103980624 A | 8/2014 |
| EP | 1036815 A1 | 9/2000 |
| JP | 09-029877 A | 2/1997 |
| JP | 09-31275 A | 2/1997 |
| JP | 2004-059929 A | 2/2004 |
| JP | 2005-220174 A | 8/2005 |
| JP | 2007-031462 A | 2/2007 |
| JP | 2010-275528 A | 12/2010 |
| WO | 9928382 A1 | 6/1999 |

OTHER PUBLICATIONS

"Antiflame MC Melamine Cyanurate" by Topchem. Accessible at www.topchem.com/cn/antiflame1.pdf. Wayback Machine Archive date Oct. 21, 2013. (Year: 2013).*
Machine translation of CN 1978475 by Fan et al. (Year: 2007).*
Britton, Robin. Update on Mouldable Particle Foam Technology. Shrewsbury, Shropshire, GBR: Smithers Rapra, 2009. p. 18 http://site.ebrary.com/lib/uspto/Doc?id=10326378&ppg=18 (Year: 2009).*
Office Action issued in Taiwanese Patent Application No. 104126416; dated Jan. 30, 2019 (7 pages).
Office Action issued in corresponding Chinese Application No.: 201510571294.8; dated Sep. 16, 2019 (12 pages).

* cited by examiner

*Primary Examiner* — Michael M Dollinger
*Assistant Examiner* — Christina H. W. Rosebach
(74) *Attorney, Agent, or Firm* — Osha Liang LLP

(57) ABSTRACT

To provide a novel expanded polystyrene-based resin formed product that is excellent in expandability, mechanical strength, hardness, antistatic property, heat resistance and flame retardancy and does not generate squeak noises, and a production method thereof. Provided is expandable polystyrene-based resin particles having rubber and melamine cyanurate on the surfaces thereof.

9 Claims, No Drawings

EXPANDED POLYSTYRENE-BASED RESIN FORMED PRODUCT COMPRISING RUBBER-LIKE LATEX AND MELAMINE CYANURATE AND PRODUCTION METHOD THEREOF

CROSS-REFERENCE TO RELATED APPLICATIONS

This application claims the benefit of priority based on Japanese patent application No. 2014-183162 filed on Sep. 9, 2014, the content of which is incorporated herein by reference.

BACKGROUND OF THE INVENTION

1. Field of the Invention

The present invention relates to an expanded polystyrene-based resin formed product comprising a rubber-like latex and melamine cyanurate, and relates to a production method thereof.

2. Description of the Related Art

An expanded polystyrene-based resin formed product has excellent heat resistance and cushioning property due to the presence of closed cells. However, it has defects that the surface of a formed product is brittle, mechanical strength is low, etc., because of the low density (light weight) thereof. In addition, it has defects that, due to combustibility of a polystyrene base material, and due to air in cells and a remaining combustible expanding agent, an expanded styrene resin-based formed product is easily burned when placed near an ignition source. Further, in a styrene-based resin formed product, static electricity tends to be generated easily and hence dust is easily adhered thereto. In addition, when formed products are rubbed, unpleasant squeak noises are generated. Under such circumstances, elimination of these defects to increase its demand has been desired.

As attempts to overcome these defects, the inventors of the present invention proposed expandable styrene-based resin particles having a rubber-like latex on the surfaces thereof (Patent Document 1). However, although hardness or mechanical strength of the surface of a formed product is improved, effects of flame retardancy have not yet been obtained. Further, the inventors of the present invention proposed to incorporate an inorganic compound by utilizing a binder function of a rubber-Like latex (Patent Document 2). However, although combustibility is lowered, effects of attaining high expandability have not yet been realized.

As known methods for imparting flame retardancy that has heretofore been conducted include: a method in which expandable polystyrene resin particles during the process of synthesis are impregnated with a bromine- or chlorine-containing organic halogen compound singly or in a mixture with an organic peroxide; a method in which a styrene-based resin is kneaded together with a bromine- or chlorine-containing organic halogen compound by means of an extruder, followed by forming a sheet or a board with an expanding agent added (Patent Document 3); etc. However, in these methods, a toxic halogen compound is generated as a combustion gas, and may cause health damage or environmental contamination. Further, due to the presence of a halogen compound in these formed products, recycling is difficult. In order to burn them as an industrial waste, not only a special incinerator that enables high-temperature combustion is required but also expensive capital investment and a huge amount of running cost are incurred.

Further, other proposed method include: a method in which brominated polystyrene is used (e.g. Patent Document 4); a method in which a brominated diphenyl compound and an antimony oxide are mixed (e.g. Patent Document 5); and a method in which an organic phosphorus-based additive is incorporated as a flame retardant (e.g. Patent Documents 6 and 7) are proposed. Each of these materials is not only expensive but also may lead to health damage or environmental contamination.

For preventing generation of static electricity, generally known technology is a method in which a formed product is impregnated with a surfactant of which the hydrophilic group contains an anion or a cation, a nonionic surfactant or the like or a method in which such a surfactant is applied to a formed product. However, in this method, a surfactant is peeled off readily from the surface of a formed product, and hence, effects of continuously suppressing generation of static electricity are insufficient.

In order to prevent generation of squeak noises that are generated when expanded polystyrene-based resin formed products are rubbed, with an aim of improving slidability of a formed product, conducted is a method using, as a lubricant, soap such as metal salts of a higher fatty acid. Specifically, a method in which expandable polystyrene resin particles are impregnated with such soap or a method in which such soap is adhered to the surface of an expanded polystyrene resin formed product is adopted. However, advantageous effects of the methods are not sufficient. Further, a method in which an unwoven fabric or a plastic sheet is adhered to the surface of an expanded polystyrene resin formed product is adopted. However, in this method, a large number of steps is required, leading to a steep rise in processing cost.

RELATED ART DOCUMENTS

Patent Documents

[Patent Document 1] JP-A-2005-220174
[Patent Document 2] JP-A-2007-31462
[Patent Document 3] JP-A-2010-275528
[Patent Document 4] JP-A-H09-29877
[Patent Document 5] JP-A-H09-31275
[Patent Document 6] WO99/28382
[Patent Document 7] JP-A-2004-59929

SUMMARY OF THE INVENTION

An expanded polystyrene-based resin formed product has a soft and brittle surface and has low mechanical strength. Further, it is combustible, is statically charged easily and generates intolerably unpleasant squeak noises when rubbed.

One or more embodiments of the present invention provide a novel expanded polystyrene-based resin formed product having excellent expandability, mechanical strength, hardness, antistatic property, heat resistance and flame retardancy, and generating no squeak noises, as well as at providing a production method thereof.

Melamine cyanurate is known as an excellent flame retardant. Therefore, the inventors of the present invention thought that combustibility can be effectively suppressed if melamine cyanurate can be incorporated into expandable polystyrene-based resin particles. The inventors made attempts to cause expandable polystyrene-based resin particles to be impregnated with melamine cyanurate. However, these attempts were all ended in failure. The reason therefor is as follows. Melamine cyanurate is insoluble in water or a styrene monomer since it has a structure in which melamine and cyanuric acid are firmly bonded via a hydrogen bond, and if melamine cyanurate is added during the process of producing expandable polystyrene-based resin particles, it does not affect a suspension system of water and a styrene monomer at all. Further, an attempt was made to coat the surfaces of expanded polystyrene-based resin particles with melamine cyanurate. However, no advantageous effects were brought about by simply mixing expandable polystyrene-based resin particles and melamine cyanurate.

The inventors of the present invention made further extensive studies based on the above-mentioned finding. As a result, they found that, by incorporating a rubber-like latex and melamine cyanurate into a polystyrene-based resin formed product, mechanical strength, hardness, antistatic property, heat resistance and flame retardancy can be imparted without impairing excellent heat insulating property and cushioning property that are exhibited by conventional expanded polystyrene-based resin formed product. That is, the inventors of the present invention have led to the present invention based on a finding that a rubber-like latex has good compatibility with melamine cyanurate and it has significantly good adhesiveness with expandable polystyrene-based resin particles or an expanded polystyrene-based resin formed product.

According to one or more embodiments of the present invention, the following expandable polystyrene-based resin particles or the like are provided.

1. Expandable polystyrene-based resin particles comprising rubber and melamine cyanurate on the surface thereof.
2. The expandable polystyrene-based resin particles according to 1, wherein the rubber is synthetic rubber, an acrylic ester copolymer, acrylic rubber, wax or a mixture of two or more of these.
3. A method for producing the expandable polystyrene-based resin particles according to 1 or 2, comprising
    mixing melamine cyanurate with rubber-like latex to prepare a rubber-like latex mixture, and
    coating expandable polystyrene-based resin particles with the rubber-like latex mixture.
4. The method for producing the expandable polystyrene-based resin particles according to 3, wherein ethyl alcohol is mixed with the rubber-like latex to prepare the rubber-like latex mixture.
5. The method for producing the expandable polystyrene-based resin particles according to 3 or 4, wherein the rubber-like latex is a synthetic rubber latex, an acrylic acid ester copolymer emulsion, an acrylic rubber emulsion, a wax emulsion or a mixture of two or more of these.
6. Pre-expanded polystyrene-based resin particles comprising rubber and melamine cyanurate on the surfaces thereof.
7. The pre-expanded polystyrene-based resin particles according to 6, wherein the rubber is synthetic rubber, an acrylic acid ester copolymer, acrylic rubber, wax or a mixture of two or more of these.
8. A method for producing pre-expanded polystyrene-based resin particles comprising pre-expanding the expandable polystyrene-based resin particles according to 1 or 2.
9. An expanded polystyrene-based resin formed product comprising rubber and melamine cyanurate on the surface thereof.
10. The expanded polystyrene-based resin formed product according to 9, wherein the rubber is synthetic rubber, an acrylic acid ester copolymer, acrylic rubber, an acrylic acid ester copolymer, wax or a mixture of two or more of these.
11. A method for producing an expanded polystyrene-based resin formed product comprising expanding the expandable polystyrene-based resin particles according to 1 or 2.
12. The method for producing the expanded polystyrene-based resin formed product according to 11, wherein the expandable polystyrene-based resin particles are pre-expanded, followed by heat forming.
13. A method for producing an expanded polystyrene-based resin formed product comprising expanding the expandable polystyrene-based resin particles according to 1 or 2 by extruding with an extruder.
14. A method for producing the expanded polystyrene-based resin formed product according to 9 or 10, comprising
    pre-expanding expandable polystyrene-based resin particles, followed by heat forming to form an expanded polystyrene-based resin formed product,
    mixing melamine cyanurate with rubber-like latex to prepare a rubber-like latex mixture, and
    coating the expanded polystyrene-based resin formed product with the rubber-like latex mixture.
15. The method for producing the expandable polystyrene-based resin formed product according to 14, wherein the rubber-like latex is a synthetic resin latex, an acrylic acid ester copolymer emulsion, an acrylic rubber emulsion, a wax emulsion or a mixture of two or more of these.
16. The method for producing the expandable polystyrene-based resin formed product according to any one of 11 to 15, wherein ethyl alcohol is further mixed with the rubber-like latex to prepare the rubber-like latex mixture.

According to one or more embodiments of the present invention, it is possible to provide a novel expanded polystyrene-based resin formed product that has excellent expandability, mechanical strength, hardness, antistatic property, heat resistance and flame retardancy and that does not generate squeak noises, and also to provide a production method thereof.

DETAILED DESCRIPTION OF EMBODIMENTS OF THE INVENTION

Hereinbelow, a detailed explanation will be made on the expandable polystyrene-based resin particles, the expanded polystyrene-based resin formed product and a production method thereof according to one or more embodiments of the present invention.

[Expandable Polystyrene-Based Resin Particles]

The expandable polystyrene-based resin particles according to one or more embodiments of the present invention comprise rubber and melamine cyanurate on the surfaces thereof.

By using the expandable polystyrene-based resin particles according to one or more embodiments of the present invention, it is possible to allow an expanded styrene-based resin formed product that is obtained by expanding these particles to have excellent expandability, mechanical strength, hardness, antistatic property, heat resistance and flame retardancy and to be free from generation of squeak noises.

Rubber on the surface of the expandable polystyrene-based resin particles may form a rubber layer, and the rubber layer can be a continuous layer. Melamine cyanurate firmly covers the surfaces of the expandable polystyrene-based resin particles by the rubber layer formed by the rubber-like latex.

One embodiment of the expandable polystyrene-based resin particles of the present invention are expandable polystyrene-based resin particles having a rubber layer on the surfaces thereof, wherein the rubber layer comprises melamine cyanurate.

In the expandable polystyrene-based resin particles according to one or more embodiments of the present invention, for example, 90 wt % or more, 95 wt % or more, 98 wt % or more and 100 wt % thereof may comprise expandable polystyrene-based resin particles, rubber, melamine cyanurate, and optionally, an anti-blocking agent, a forming cycle shortening agent and a wetting enhancer.

In the expandable polystyrene-based resin particles according to one or more embodiments of the present invention, a part or an entire surface of the expandable polystyrene-based resin particles is coated with the rubber or the rubber layer. According to one or more embodiments, it is preferred that almost an entire surface of the expandable polystyrene-based resin particles be coated with the rubber or the rubber layer.

In the expandable polystyrene-based resin particles according to one or more embodiments of the present invention, it is preferred that the particles have melamine cyanurate on the surfaces thereof or that the rubber layer comprise melamine cyanurate.

The expandable polystyrene-based resin particles according to one or more embodiments of the present invention are polystyrene particles or particles of a copolymer with a monomer that can copolymerize with styrene. The expandable polystyrene-based resin particles according to one or more embodiments of the present invention may be a mixture of plural types of resin particles. In one or more embodiments of the present invention, the "particles" simply mean fine particles, and the shape thereof is not particularly restricted. The particles include spherical particles and particles in other shapes.

As the monomer that can be copolymerized with styrene, a styrene derivative such as α-methylstyrene and vinyltoluene or a substitution product thereof, methacrylic acid alkyl ester such as methyl methacrylate, acrylonitrile, butadiene, butyl acrylate and an olefin such as ethylene and propylene can be given. According to one or more embodiments, the amount of the monomer that can be copolymerized with styrene is preferably less than 50 mass % relative to the total amount of the monomers constituting a copolymer. The amount of the monomer is not limited thereto, and a different amount may be used according to the purpose.

The expandable polystyrene-based resin particles are impregnated with an expanding agent. As the expanding agent, an aliphatic hydrocarbon such as propane, butane, pentane and hexane can be given. As the impregnation method of an expanding agent, a suspension polymerization method or an extrusion expansion method, that is a method already known in the art, can be given.

As the expandable polystyrene-based resin particles, commercially available resin particles can be appropriately selected and used. These particles can be produced by a known technology.

The rubber according to one or more embodiments of the present invention is a mixture of synthetic rubber, an acrylic acid ester copolymer, acrylic rubber, wax or a mixture of two or more of these. They are respectively obtained from a synthetic rubber latex, an acrylic acid ester copolymer emulsion, an acrylic rubber emulsion and a wax emulsion.

As the synthetic rubber latex, a latex of a modified acrylonitrile-butadiene copolymer, a modified acrylic acid ester-butadiene copolymer, a modified styrene-butadiene copolymer, a modified methacrylic acid ester-butadiene copolymer or the like can be given. As for modification, in order to improve adhesiveness or heat resistance, a carboxyl group-modification or an alkoxysilyl group-modification or the like can be given.

The emulsifier used for preparing an emulsion may be any of an anionic emulsifier, a nonionic emulsifier or a soap-free type emulsifier.

The melamine cyanurate used in one or more embodiments of the present invention is a salt in which melamine and cyanuric acid are firmly bonded via a hydrogen bond, and is insoluble in water or an organic solvent. According to one or more embodiments, it is preferred that the particle size of the crystals used be 5 microns or less. However, the crystal size may be 25 microns or less. This salt has heat resistance, but when heated to 300° C. or higher, it decomposes to generate an inert gas such as nitrogen and shows flame retardancy.

The expandable polystyrene-based resin particles according to one or more embodiments of the present invention may optionally comprise one or two or more selected from an anti-blocking agent, a forming cycle shortening agent and a wettability improving agent. As for these optional components, an explanation will be given later with reference to the method for producing the expandable polystyrene-based resin particles according to one or more embodiments of the present invention.

[Method for Producing Expandable Polystyrene-Based Resin Particles]

The method for producing the expandable polystyrene-based resin particles according to one or more embodiments of the present invention comprises mixing melamine cyanurate with a rubber-like latex to prepare a rubber-like latex mixture, and coating expandable polystyrene-based resin particles with the rubber-like latex mixture.

According to one or more embodiments of the present invention, melamine cyanurate is mixed with the rubber-like latex. The melamine cyanurate can be effectively adhered to the surface of the expandable polystyrene-based resin particles by utilizing binder properties of the latex.

For example, the rubber-like latex mixture can be prepared by adding melamine cyanurate to the rubber-like latex at room temperature of 30° C. or less, followed by mixing in a common stirring chamber provided with a screw, etc.

The mixing ratio of the melamine cyanurate is 0.1 to 50 parts by mass relative to 100 parts by mass of the rubber-like latex. In respect of properties and productivity, the mixing ratio of the melamine cyanurate is 5 to 20 parts by mass relative to 100 parts by mass.

In order to enhance one or more of the advantageous effects according to one or more embodiments of the invention, a modifier can be added to the rubber-like latex mixture according to a purpose.

For example, when melamine cyanurate is mixed with the rubber-like latex, in order to enhance the compatibility with the latex, a small amount of ethyl alcohol may be added as the modifier. The amount of the ethyl alcohol is about 10 parts by mass relative to 100 parts by mass of the rubber-like latex.

Melamine cyanurate is a bulky material having a small specific gravity. Therefore, by addition and mixing of ethyl alcohol, conformability of the melamine cyanurate with the rubber-like latex is improved, whereby melamine cyanurate can be mixed well with the rubber-like latex. As a result, the time required for mixing when preparing the rubber-like latex mixture can be shortened, leading to improvement in productivity.

After the expandable polystyrene-based resin particles are coated with the rubber-like latex mixture, followed by drying, almost no ethyl alcohol remains on the expandable polystyrene-based resin particles. Accordingly, almost no ethyl alcohol is contained in an expanded polystyrene-based resin formed product produced by using the expandable polystyrene-based resin particles.

In order to improve the adhesiveness between the rubber-like latex mixture and the expandable polystyrene-based resin particles, a wettability enhancer such as sodium diisooctyl sulfosuccinate can be appropriately added. The amount of a wettability enhancer is about 10 parts by mass relative to 100 parts by mass of the rubber-like latex, for example.

Other materials used in the production method are as mentioned above with reference to the expandable polystyrene-based resin particles according to one or more embodiments of the present invention.

The method for coating the expandable polystyrene-based resin particles with the rubber-like latex mixture includes, for example, a method in which the expandable polystyrene-based resin particles and the rubber-like latex mixture are mixed by means of a blender such as a ribbon blender and a blender or a mixer such as a Henschel mixer, a Lodige mixer and a concrete mixer.

According to one or more embodiments, it is preferred that a surface of each particle of the expandable polystyrene-based resin particles be uniformly coated with the rubber-like latex mixture. In this respect, a mixing method utilizing high-speed rotation using a Henschel mixer or the like is more preferable.

As compared with other methods such as a method using a ribbon blender, use of a Henschel mixer can lead to shortening of the mixing time, whereby productivity can be improved. Use of a Henschel mixer also has an advantage that, by transmission of friction heat generated by high-speed rotation to the materials, adhesiveness between the materials can be improved and moisture of the rubber-like latex tends to be evaporated easily.

The mixing ratio of the expandable polystyrene-based resin particles and the rubber-like latex in one or more embodiments of the present invention is 0.05 to 30 parts by mass of the rubber-like latex mixture relative to 100 parts by mass of the expandable polystyrene-based resin particles, for example.

In respect of properties and productivity according to one or more embodiments, it is preferred that the amount of the rubber-like latex mixture be 0.1 to 10 parts by mass relative to 100 parts by mass of the expandable polystyrene-based resin particles.

As for the expandable polystyrene-based resin particles which are coated with the rubber-like latex mixture by the above-mentioned method in accordance with one or more embodiments, it is preferred that moisture in the rubber-like latex mixture be removed by drying without causing dissipation of an expanding agent. The method and conditions of drying can be appropriately determined.

Further, an anti-blocking agent such as zinc stearate may be added, for example, in an amount of 0.01 to 0.3 parts by mass relative to 100 parts by mass of the expandable polystyrene-based resin particles.

In addition, a forming cycle shortening agent such as acyl triglyceride may be added, for example, in an amount of 0.005 to 1.0 parts by mass relative to 100 parts by mass of the expandable polystyrene-based resin particles.

[Pre-Expanded Polystyrene-Based Resin Particles]

The pre-expanded polystyrene-based resin particles according to one or more embodiments of the present invention have rubber and melamine cyanurate on the surfaces thereof.

The method for producing the pre-expanded polystyrene-based resin particles according to one or more embodiments of the present invention comprises pre-expanding the above-mentioned expandable polystyrene-based resin particles according to one or more embodiments of the present invention. The method for pre-expanding is not particularly restricted and a method that has conventionally been known can be used.

The materials used are as explained above with reference to the expandable polystyrene-based resin particles according to one or more embodiments of the present invention.

[Expanded Polystyrene-Based Resin Formed Product]

The expandable polystyrene-based resin formed product according to one or more embodiments of the present invention has rubber and melamine cyanurate on the surface thereof.

In the expanded polystyrene-based resin formed product according to one or more embodiments of the present invention, the surface thereof is coated with rubber, and melamine cyanurate is adhered to the rubber in a dispersed state.

The expanded polystyrene-based resin formed product according to one or more embodiments of the present invention is excellent in expandability, mechanical strength, hardness, antistatic property, heat resistance and flame retardancy, and does not generate squeak noises.

In the expanded polystyrene-based resin product according to one or more embodiments of the present invention, it is preferred that almost an entire surface thereof be coated with rubber.

Further, according to one or more embodiments, it is preferred that melamine cyanurate be dispersed on the surface of the formed product as well as in the inside of the formed product.

One embodiment of the expanded polystyrene-based resin formed product according to one or more embodiments of the present invention is an expanded polystyrene-based resin formed product that has a rubber layer on the surface thereof, wherein the rubber layer comprises melamine cyanurate.

As for the expanded polystyrene-based resin formed product according to one or more embodiments of the present invention, 90 wt % or more, 95 wt % or more, 98 wt % or more or 100 wt % thereof may comprise a polystyrene-based resin, rubber, melamine cyanurate, and optionally, an anti-blocking agent, a forming cycle shortening agent and a wettability enhancer, for example.

In the expanded polystyrene-based resin formed product according to one or more embodiments of the present invention, it is preferred that it have melamine cyanurate on the surface thereof or that the rubber layer comprise melamine cyanurate.

The materials used are as explained above with reference to the expandable polystyrene-based resin particles according to one or more embodiments of the present invention.

[Method for Producing Expanded Polystyrene-Based Resin Formed Product]

The method for producing the expanded polystyrene-based resin formed product according to one or more embodiments of the present invention comprises expanding the above-mentioned expandable polystyrene-based resin particles according to one or more embodiments of the present invention.

Specifically, the expanded polystyrene-based resin particles according to one or more embodiments of the present invention are pre-expanded, and the pre-expanded resin particles are put in a prescribed mold to subject them to heat forming, whereby an expanded polystyrene-based resin formed product having a prescribed shape can be produced.

Alternatively, by subjecting the expandable polystyrene-based resin particles according to one or more embodiments of the present invention to expansion extrusion with an extruder, an expanded polystyrene-based resin formed product having a sheet-like shape or a predetermined shape can be produced.

Alternatively, by injecting an expanding agent under pressure while extruding the expandable polystyrene-based resin particles according to one or more embodiments of the present invention with an extruder, an expanded polystyrene-based resin formed product having a sheet-like shape or a prescribed shape can be produced.

In addition, one embodiment of the method for producing the expanded polystyrene-based resin formed product according to one or more embodiments of the present invention comprises pre-expanding expandable polystyrene-based resin particles, followed by heat forming to form an expanded polystyrene-based resin formed product, mixing melamine cyanurate with a rubber-like latex to prepare a rubber-like latex mixture, and coating the expanded polystyrene-based resin formed product with the rubber-like latex mixture.

The method for coating the expanded polystyrene-based resin formed product with the rubber-like latex mixture includes coating with a brush, spraying with a spray gun, immersion of a formed product in the rubber-like latex mixture, or the like. After coating, by drying at a temperature of from room temperature to 80° C., moisture in the rubber latex mixture can be removed. According to one or more embodiments, the thickness of the rubber-like latex mixture coating is normally 0.1 to 100 µm and preferably 5 to 70 µm, before drying.

In the method for producing the expanded polystyrene-based resin formed product according to one or more embodiments of the present invention, it is preferred that melamine cyanurate be mixed with the rubber-like latex and ethyl alcohol be further mixed, thereby to prepare the rubber-like latex mixture.

The materials used in the production method are as explained above with reference to the expandable polystyrene-based resin particles according to one or more embodiments of the present invention.

EXAMPLES

The present invention will be explained in more detail with reference to the examples, which should not be construed as limiting the scope of the invention.

The materials used in the Examples are as follows:
(1) Expandable Polystyrene-Based Resin Particles
Expandable polystyrene resin particles (Product name: Styrodia (registered trademark) manufacture by JSP Corporation (hereinafter also referred to as "EPS")
(2) Rubber-Like Latex
Modified acrylonitrile-butadiene copolymer latex (Product name: Nipol (registered trademark) SX1503A, manufactured by Zeon Corporation, concentration 42%) (hereinafter also referred to as "AN-B")
Modified acrylic acid ester-butadiene copolymer latex (Product name: Nipol (registered trademark) SX1105A, manufactured by Zeon Corporation, concentration 45%) (hereinafter also referred to as "ST-B")
Slightly carboxy-modified styrene-butadiene copolymer latex (Product name: NALSTAR (registered trademark) SR-107, manufactured by Nippon A&L Inc., concentration 48%) (hereinafter also referred to as "CST-B")
Wax emulsion (Product name: EMUSTAR-0135 (registered trademark) manufactured by Nippon Seiro Co., Ltd., concentration 40%) (hereinafter also referred to as "W-E")
(3) Melamine Cyanurate
Melamine cyanurate (Product name: Melamine Cyanurate/MC manufactured by Nissan Chemical Industries, Ltd.)

Example 1

100 g of melamine cyanurate and 50 g of ethyl alcohol relative to 1 kg of modified acrylonitrile-butadiene copolymer were put in a 2 L-flask provided with H vane impeller blades, and the resultant was stirred at 200 rpm at 25° C. for 10 minutes, thereby to prepare a rubber-like latex mixture.

Subsequently, 50 g (0.5 parts by mass) of the rubber-like latex mixture was added to 10 kg (100 parts by mass) of the expandable polystyrene resin particles, and the resultant was mixed by means of a compact Henschel mixer for one minute. Then, 10 g (0.1 parts by mass) of zinc stearate was added, followed by mixing for further one minute. The expandable polystyrene-based resin particles after the mixing were dry, and were coated with the rubber-like latex mixture.

These resin particles were pre-expanded by 51 times in terms of bulk expansion ratio (density 19.6 kg/cm$^3$) by means of a pre-expanding machine (HBP-500 manufactured by Hitachi Chemical Technoplant Co., Ltd.), and the resulting pre-expanded particles were aged at room temperature for 16 hours.

Subsequently, by using the aged pre-expanded particles, forming was conducted at a steam pressure of 0.07 MPa by means of a forming machine (VS-500 manufactured by Daisen Co., Ltd.) provided with a mold having a cavity for obtaining 6 flat plate-like formed product (dimension: 300 mm (length)×50 mm (width)×20 mm (thickness)), whereby 12 formed products each having a bulk expansion ratio of 50 times (density 20.0 kg/m$^3$) were obtained. These formed products each contained rubber and melamine cyanurate in the inside and on the surface thereof.

Example 2

12 formed products each having a bulk expansion ratio of 50 times (density 20.0 kg/m$^3$) were obtained in the same manner as in Example 1, except that 1 kg of a modified acrylic acid ester-butadiene copolymer latex was used instead of the modified acrylonitrile-butadiene copolymer latex.

Example 3

12 formed products each having a bulk expansion ratio of 50 times (density 20.0 kg/m$^3$) were obtained in the same manner as in Example 1, except that 1 kg of a slightly carboxy-modified styrene-butadiene copolymer latex was used instead of the modified acrylonitrile-butadiene copolymer latex.

Example 4

12 formed products each having a bulk expansion ratio of 50 times (density 20.0 kg/cm$^3$) were obtained in the same manner as in Example 1, except that 1 kg of a wax emulsion was used instead of the modified acrylonitrile-butadiene copolymer latex.

Example 5

12 formed products each having a bulk expansion ratio of 50 times (density 20.0 kg/m$^3$) were obtained in the same manner as in Example 1, except that the amount of melamine cyanurate was increased from 100 g to 200 g when preparing the rubber-like latex mixture in Example 1.

Example 6

12 formed products each having a bulk expansion ratio of 50 times (density 20.0 kg/m$^3$) were obtained in the same manner as in Example 1, except that the amount of melamine cyanurate was decreased from 100 g to 50 g when preparing the rubber-like latex mixture in Example 1.

Example 7

When 10 kg (100 parts by mass) of the expandable polystyrene-based resin particles and 50 g (0.5 parts by mass) of the rubber-like latex mixture were mixed in Example 1, the mixing was conducted for 10 minutes while blowing air by using a concrete mixer instead of the Henschel mixer. After the mixing, the expandable polystyrene resin particles were dry. In the same manner as in Example 1, 12 formed products each having a bulk expansion ratio of 50 times (density: 20.0 kg/m$^3$) were obtained.

Example 8

By using expandable polystyrene resin particles having no rubber-like latex mixture being applied to the surfaces thereof and with which only 0.1 parts by mass of zinc stearate was mixed, pre-expanding and forming were conducted in the same manner as in Example 1, whereby 12 formed products each having a bulk expansion ratio of 50 times (density 20.6 kg/m$^3$) were obtained. The mass of a single formed product was 6.03 g.

The resulting formed products were immersed in the rubber-like latex mixture comprising melamine cyanurate prepared in Example 1. After the immersion, the excessive rubber-like latex mixture adhered was removed, and dried for 2 hours in a drying room of 60° C. The mass of the formed product after drying was 6.18 g.

Example 9

Relative to 100 parts by mass of the expandable polystyrene resin particles coated with the rubber-like latex mixture prepared in Example 1, 1 parts by mass of talc was mixed for one minute by means of a Henschel mixer. By means of an expansion extruder (40φ), L/D24, manufactured by Tanabe Plastic Machinery Co., Ltd.) provided with a round die having a discharge port diameter of 5 mm, the particles were extruded into a white round rod having a diameter of 50 mm with an expansion ratio of 15 times (66.7 kg/m$^3$) at a die temperature of 120° C. During the extrusion, abnormal odor or the like were not generated.

Comparative Example 1

By using particles with which only 0.1 parts by mass of zinc stearate was mixed relative to 100 parts by mass of the expandable polystyrene resin particles, pre-expanding and forming were conducted in the same manner as in Example 1, whereby 12 formed products each having a bulk expansion ratio of 50 times (density 20.0 kg/m$^3$) were obtained.

Comparative Example 2

In a Henschel mixer, only 10 kg (100 parts by mass) of expandable polystyrene resin particles, 50 g (0.5 parts by mass) of a modified acrylonitrile-butadiene copolymer latex and 10 g (0.1 parts by mass) of zinc stearate were added, and mixing was conducted for one minute. In the same manner as in Example 1, 12 formed sheets each having a bulk expansion ratio of 50 times (density 20.0 kg/m$^3$) were obtained.

Comparative Example 3

In Example 1, without using the rubber-like latex and ethyl alcohol, 10 g of melamine cyanurate and 10 g of zinc stearate relative to 10 kg of the expandable polystyrene resin particles were mixed for 2 minutes in a compact Henschel mixer. Melamine cyanurate and zinc stearate had poor adhesiveness with the expandable polystyrene resin particles, and were likely to drop off easily. Thereafter, in the same manner as in Example 1, pre-expanding and forming were conducted, whereby 12 formed products each having a bulk expansion ratio of 50 times (density 20.0 kg/m$^3$) were obtained.

As for the expandable polystyrene resin particles and the expanded polystyrene resin formed product obtained in Examples 1 to 9 and Comparative Examples 1 to 3, each property was evaluated as follows. The results are shown in Table 1.

(1) Bending Strength

The bending strength [N/cm$^2$] of a formed product was measured in accordance with JIS-A-9511 and JIS-K-7220.

(2) Surface Hardness

The surface hardness of a formed product was measured by pressing a sensor of a polystyrene foam tester (PFT-2 manufactured by Yoshida Seiki Co., Ltd.) against the surface of a formed product and the hardness was expressed by the value indicated by the sensor. According to one or more embodiments, a small value of the hardness means that the surface of a formed product is preferably hard. The minimum value and the maximum value of the hardness are 20 and 80, respectively.

(3) Antistatic Property

The charge amount [V] of the formed product was measured by means of a digital static electricity measuring device (MODEL 2050 manufactured by Hugel Electronics, Co., Ltd.).

(4) Expandability

The expandable polystyrene resin particles were immersed in boiling water of 100° C. for 5 minutes. The expansion ratios [times (ml/g)] immediately after the expansion and 24 hours after the expansion were measured.

(5) Squeak Noises

Formed products obtained in the same example or in the same comparative example were rubbed, and squeak noises generated during the rubbing were heard and evaluated. Evaluation criteria are as follows:
Excellent: No squeak noises
Good: Noises were generated, but not unpleasant
Poor: Unpleasant noises were generated (7) Heat Resistance Heat resistance was evaluated by a change in dimension (shrinkage ratio) after retaining a formed product at 80° C. and 90° C.

A formed product was divided into three equal pieces in the length direction by means of a nichrome heating wire or the like, whereby a test piece of 99 mm×50 mm×20 mm was obtained. The long side (99 mm), the short side (50 mm) and the thickness (20 mm) and the length of the diagonal of a plane formed by the long side and the short side were measured by vernier calipers. The three test pieces were simultaneously put in an incubator (Model: DEN400 manufactured by Fujimoto Chemicals Co., Ltd.). After allowing the three test pieces to stand at 80±2° C. for 5 hours, the test pieces were taken out and the dimension of each piece was measured. No dimensional change was observed in thickness. Therefore, the lengths of two diagonals of a plane formed by the long side and the short side were multiplied, and the product was further divided by a product of multiplication of the original lengths before heating of the two diagonals. The value obtained (the average of n=3) was taken as the shrinkage ratio [%] ("the 80° C. shrinkage ratio" in Table 1).

Similarly, other three test pieces were allowed to stand for 2 hours at 90±2° C. for 2 hours, and then the dimensions thereof were measured to calculate the shrinkage ratio [%] (the "90° C. shrinkage ratio" in Table 1).

A shrinkage ratio value closer to 100% means the degree of shrinkage of the test piece was small, i.e. the test piece had excellent heat resistance.

(8) Flame Retardancy

Flame retardancy of the formed products was evaluated in accordance with JIS-A-9511. The test piece in which the fire was extinguished within 3 seconds after separation from an ignition source was evaluated as "self-extinguishable" and the test piece in which the fire was not extinguished within 3 seconds was evaluated as "combustible".

TABLE 1

| | | | Examples | | | | | | |
|---|---|---|---|---|---|---|---|---|---|
| | | | 1 | 2 | 3 | 4 | 5 | 6 | 7 |
| Materials for formed product | Base material for formed product (parts by mass) | | EPS 100 | EPS 100 | EPS 100 | EPS 100 | EPS 100 | EPS 100 | EPS 100 |
| | Rubber-like latex (parts by mass) | | AN•B 0.5 | ST•B 0.5 | CST•B 0.5 | W•E 0.5 | AN•B 0.5 | AN•B 0.5 | AN•B 0.5 |
| | Melamine cyanurate (parts by mass) | | 0.05 | 0.05 | 0.05 | 0.05 | 0.1 | 0.025 | 0.05 |
| | Other additives | | ETOH STZN | ETOH STZN | ETOH STZN | ETOH STZN | ETOH STZN | ETOH STZN | ETOH STZN |
| Mixing method | | | HM | HM | HM | HM | HM | HM | CM |
| Properties for evaluation | Density (kg/cm$^3$) | | 20 | 20 | 20 | 20 | 20 | 20 | 20 |
| | Bending strength (N/cm$^2$) | | 43 | 41 | 45 | 46 | 43 | 42 | 40 |
| | Surface hardness (—) | | 50 | 49 | 49 | 51 | 49 | 50 | 48 |
| | Charge amount (V) | | −70 | −75 | −74 | −77 | −73 | −75 | −80 |
| | Expandability (ml/g) | Immediately after expanding | 85 | 83 | 80 | 81 | 87 | 80 | 80 |
| | | 24 hours after expanding | 85 | 84 | 82 | 82 | 87 | 82 | 82 |
| | Squeak noise | | Good | Good | Good | Good | Good | Good | Good |
| | Heat resistance (%) | Shrinkage ratio at 80° C. | 99.5 | 99.6 | 99.4 | 99.8 | 99.9 | 99.3 | 99.3 |
| | | Shrinkage ratio at 90° C. | 97.5 | 96.5 | 96.8 | 97.3 | 98.0 | 96.2 | 96.4 |
| | Flame retardancy | | self-extinguishable | self-extinguishable | self-extinguishable | self-extinguishale | self-extinguishable | self-extinguishable | self-extinguishable |
| | (sec) | | 0 | 0 | 0 | 0 | 0 | 1.5 | 2.1 |

| | | | Examples | | Comp. Ex. | | |
|---|---|---|---|---|---|---|---|
| | | | 8 | 9 | 1 | 2 | 3 |
| Materials for formed product | Base material for formed product (parts by mass) | | EPS 100 | EPS 100 | EPS 100 | EPS 100 | EPS 100 |
| | Rubber-like latex (parts by mass) | | AN•B 2.25 | AN•B 0.5 | — | AN•B 0.5 | — |
| | Melamine cyanurate (parts by mass) | | 0.25 | 0.05 | — | — | 0.05 |
| | Other additives | | ETOH STZN | ETOH STZN Talc | STZN | STZN | STZN |
| Mixing method | | | Immersion | HM | HM | HM | HM |
| Properties for evaluation | Density (kg/cm$^3$) | | 20.6 | 66.7 | 20 | 20 | 20 |
| | Bending strength (N/cm$^2$) | | 48 | — | 32 | 40 | 33 |
| | Surface hardness (—) | | 51 | — | 57 | 51 | 58 |
| | Charge amount (V) | | −70 | — | −11,000 | −80 | −9,900 |
| | Expandability (ml/g) | Immediately after expanding | — | — | 72 | 78 | 73 |
| | | 24 hours after expanding | — | — | 73 | 78 | 73 |
| | Squeak noise | | Good | Good | Poor | Good | Poor |
| | Heat resistance (%) | Shrinkage ratio at 80° C. | 99.4 | — | 94.0 | 93.8 | 95.0 |
| | | Shrinkage ratio at 90° C. | 96.9 | — | 89.1 | 90.3 | 90.1 |
| | Flame retardancy | | self-extinguishable | self-extinguishable | Burned | Burned | Burned |
| | (sec) | | 0 | 0 | | | |

In the table, ETOH means ethyl alcohol, STZN means zinc stearate, HM means a Henschel mixer and CM means a concrete mixer.

In Table 1, the mixing amount of each material used as the material for a formed product is indicated in terms of part by mass of each material, relative to the mixing amount of expandable polystyrene-based resin particles (base material of the formed product) that is taken as 100 parts by mass.

As compared with the formed product in Comparative Example 2 in which only the rubber-like latex was used, the expanded styrene-based resin formed products of the present invention kept high bending strength, and had excellent surface hardness, antistatic property, heat resistance and flame retardancy.

The expanded styrene-based resin formed product of the present invention had excellent in expandability, mechanical strength, hardness, antistatic property, heat resistance and flame retardancy in a well-balanced manner, and generated no squeak noises.

The expanded styrene-based resin formed product of the present invention is excellent in expandability, mechanical strength, hardness, heat resistance, flame retardancy or the like. Utilizing these properties, the expanded styrene-based resin formed product of the present invention can be used in various applications including structural elements, heat-insulating elements, packing materials, cushioning materials, etc. According to one or more embodiments, it can be preferably used as building materials for housings, blocks for banking, automobile components such as a floor spacer of a vehicle and a bumper, a container for vegetables, a container for sea foods, etc.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

What is claimed is:

1. Expandable polystyrene-based resin particles comprising:
   a rubber layer on the surface thereof,
   wherein the rubber layer comprises rubber and melamine cyanurate,
   wherein the rubber layer contains the melamine cyanurate in an amount of 5 to 20 parts by mass relative to 100 parts by mass of the rubber layer, and
   wherein the rubber is a modified acrylonitrile-butadiene copolymer, a modified acrylic acid ester-butadiene copolymer, a modified styrene-butadiene copolymer, or a modified methacrylic acid ester-butadiene copolymer.

2. A method for producing the expandable polystyrene-based resin particles according to claim 1, comprising
   mixing melamine cyanurate with a rubber-like latex to prepare a rubber-like latex mixture, and
   coating the expandable polystyrene-based resin particles with a rubber-like latex mixture.

3. The method for producing the expandable polystyrene-based resin particles according to claim 2, wherein ethyl alcohol is mixed with the rubber-like latex and the melamine cyanurate to prepare the rubber-like latex mixture.

4. A method for producing pre-expanded polystyrene-based resin particles comprising pre-expanding the expandable polystyrene-based resin particles according to claim 1.

5. A method for producing an expanded polystyrene-based resin formed product comprising expanding the expandable polystyrene-based resin particles according to claim 1.

6. The method for producing the expanded polystyrene-based resin formed product according to claim 5, wherein the expandable polystyrene-based resin particles are pre-expanded, followed by heat forming.

7. A method for producing an expanded polystyrene-based resin formed product comprising expanding the expandable polystyrene-based resin particles according to claim 1 by extruding with an extruder.

8. The method for producing the expandable polystyrene-based resin formed product according to claim 5, wherein ethyl alcohol is further mixed with the rubber-like latex and the melamine cyanurate to prepare the rubber-like latex mixture.

9. Expandable polystyrene-based resin particles comprising:
   a rubber layer on the surface thereof,
   wherein the rubber layer comprises rubber and melamine cyanurate,
   wherein the rubber layer contains the melamine cyanurate in an amount of 5 to 20 parts by mass relative to 100 parts by mass of the rubber layer, and
   wherein the rubber is a carboxyl group-modified styrene-butadiene copolymer.

* * * * *